Figure 1:
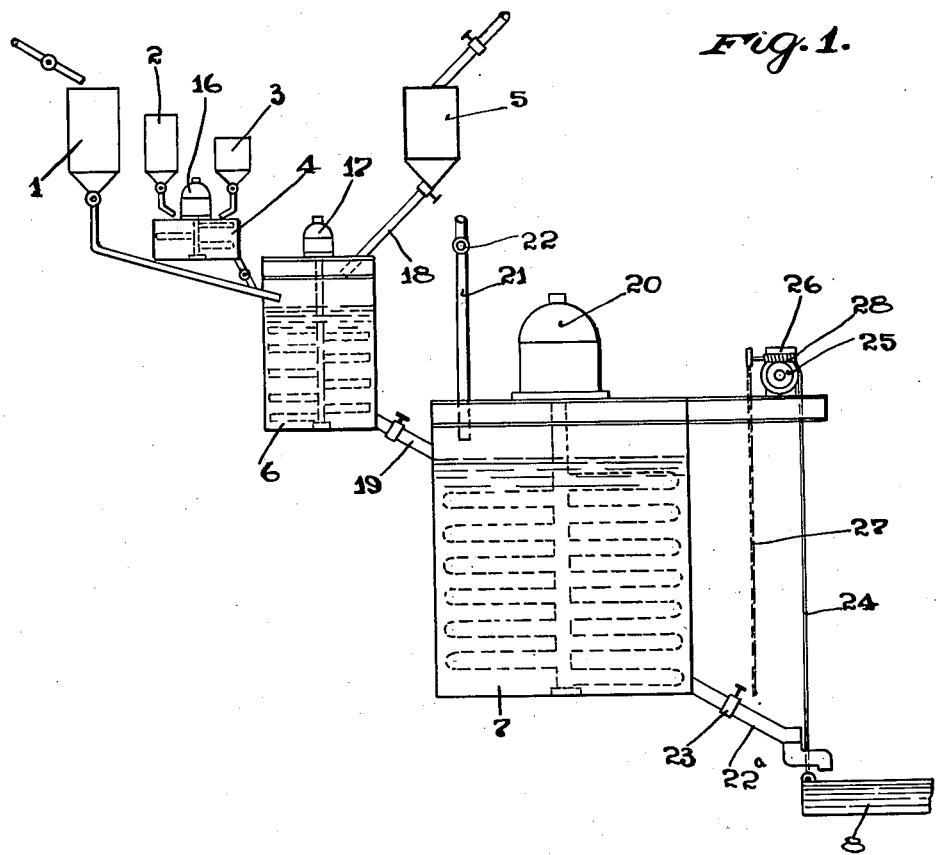

July 7, 1936. E. H. HAUX 2,046,378
METHOD OF PLASTICIZING A RESIN AND FORMING IT INTO A SHEET
Filed Dec. 22, 1934 2 Sheets-Sheet 1

INVENTOR.
ELMER H. HAUX
BY Bradley + Bee
ATTORNEYS.

July 7, 1936. E. H. HAUX 2,046,378
METHOD OF PLASTICIZING A RESIN AND FORMING IT INTO A SHEET
Filed Dec. 22, 1934 2 Sheets-Sheet 2
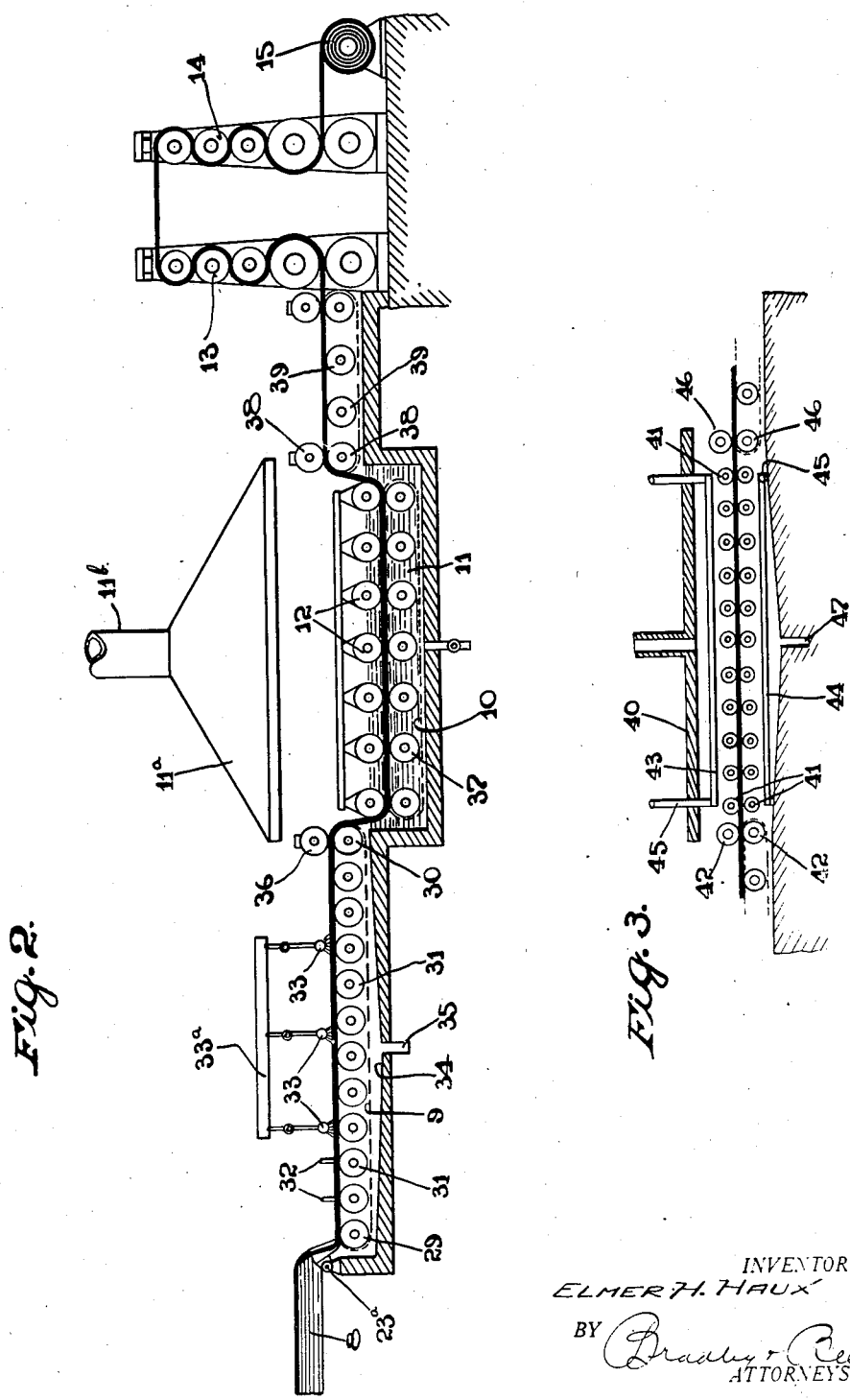
INVENTOR
ELMER H. HAUX
BY
ATTORNEYS.

Patented July 7, 1936

2,046,378

UNITED STATES PATENT OFFICE 2,046,378

METHOD OF PLASTICIZING A RESIN AND FORMING IT INTO A SHEET

Elmer H. Haux, Tarentum, Pa., assignor to Duplate Corporation, a corporation of Delaware Application December 22, 1934, Serial No. 758,782

3 Claims. (Cl. 106—22)

The invention relates to a method for plasticizing a synthetic resin and forming it into a sheet which may be used as the interlayer in safety glass or for any other purpose for which the material may be adapted. The invention has for its principal objects the provision of an improved method for very thoroughly mixing a resin and its plasticizer at a low cost, and for getting it into sheet form suitable for use, the latter object being secondary, however, since the resin plasticized by the improved method may be cake pressed and sheeted or utilized for purposes other than the formation of sheets if desired. The invention is hereinafter described in connection with a vinyl resin, such as vinyl acetal, or vinyl chlor acetate, and the plasticizers and solvents are those particularly adapted for use with this particular resin, but it will be understood that the invention is of broad application and may be used with many other resins, such as the "Glyptals", condensation products of the toluene sulfonamide group, and the like. In the plasticizing of such other resins, the plasticizers and solvents employed will be selected to meet the requirement of the particular resin, a wide range being available and well known to those skilled in the art.

As examples of the plasticizers which may be used with the vinyl resins either alone or in combination are the following: diethyl phthalate, dibutyl phthalate, tributyl phosphate and methyl cellosolve phthalate.

In carrying out the process, the resin is incorporated into a mixture which includes one or more of the above plasticizers and also a quantity of resin solvent, such as methyl alcohol, butyl alcohol, isoproponol or monoethyl ether of ethylene glycol. The use of this solvent insures a very thorough mixture of the resin and the plasticizer. It is now necessary to separate the solvent from the mixture, and this is accomplished by treating the mixture with some liquid which will mix with the solvent, but which is not a solvent of the resin and plasticizer. This requirement is met by the use of water, the treatment of the mixture with water causing the plasticized resin to form a precipitate. The precipitate mixed with water and solvent may be conducted away continuously in the form of a mat layer which is dried to remove any water and solvent therein, thus giving a continuous sheet, or the precipitate may be extruded as a sheet, or formed into a more or less solid cake and dried preliminary to cutting into sheets. The precipitate may also be shaped into any other desired form depending on the use to which the product is to be put. The drawings illustrate the practice of the invention in forming a continuous sheet.

Figure 1 is a diagrammatic side elevation of the first part of the apparatus. Fig. 2 is a similar view of the second part of the apparatus. And Fig. 3 is a section through a modification of a part of the apparatus of Fig. 2.

Referring to the drawings, 1, 2, and 3 are containers respectively for water, solvent and plasticizer; 4 is a mixer for the solvent and plasticizer; 5 is a container for the resin which is to be treated; 6 and 7 are additional mixers; 8 is a shallow feed tank or trough which receives the mixture from the tank 7; 9 is a screen conveyor over which the layer of material from the trough 7 is carried to form it into a sheet; 10 is another conveyor for conducting the sheet through a heated body of liquid 11, during which passage the sheet is colloided due to the application of heat and the pressure applied by the rolls 12; 13 and 14 are two series of calendering rolls for removing any liquid remaining in the colloided sheet; and 15 is a drum on which the finished sheet is wound.

As the first step in the operation, quantities of solvent and plasticizer from the tanks 2 and 3 are supplied to the mixer 4 which carries agitating means driven from the motor 16, the solvent preferably employed being methyl alcohol and the plasticizer being diethyl phthalate. This mixture together with water from the tank 1 is then supplied to form the mixture in the tank 6 which has an agitator driven from the motor 17. The resin to be plasticized is now supplied from the container 5 through the pipe 18, such resin being preferably vinyl acetal in solid form divided so that it will pass through a 20 to 40 mesh screen. The resin is plasticized in the mixer 6 and forms a precipitate therein, as heretofore explained, due to the fact that the solvent will go into solution with the water which is not a solvent of either the plasticizer or the resin. The agitator, however, prevents the plasticized resin from settling so that it is maintained in suspension in the mixture, and is supplied through the connection 19 to the mixer 7. The mixer is provided with an agitator driven from the motor 20. Additional water is supplied to this mixer through the supply pipe 21 having the control valve 22.

The mixture of water and solvent with the plasticized resin suspended therein is fed through the conduit 22a to the feed tank 8, a valve 23 serving to regulate the amount of flow. The tank 8 is pivoted at 23a at its forward end, and is supported at its rear end by means of a cable 24 extending around the drum 25 of the hoist 26. This drum is operated by means of the hand chain 27 which drives the drum through the reduction gearing 28. By this means the tank 8 may be tilted so as to regulate the flow of mixture or slurry to the screen conveyor 9. This screen conveyor passes around a pair of drums 29 and 30, one of which is suitably driven, and over a plurality of intermediate rollers 31 which are preferably hollow and provided with suction means to assist in withdrawing liquid from the mat layer passing thereover on the screen conveyor. A pair of spreading and leveling bars 32, 32 are preferably provided over the forward end of the conveyor in order to level off the mat layer. Water spray pipes 33 are also preferably employed over the conveyor, such pipes being fed from the supply pipe 33a. This additional supply of water serves to assist in washing out solvent which remains in the mat layer, an inclined floor 34 being provided beneath the conveyor for collecting the liquid which drains from the conveyor. This liquid is conducted away through the pipe 35 which leads to suitable means, not shown, for recovering the solvent. The mat layer as it leaves the conveyor 9 passes beneath a presser roll 36 and into the body of liquid 11 where it is carried along the screen conveyor 10. The body of liquid is preferably water heated to a temperature of about 200 deg. F., the heat, as thus supplied, helping to colloid the plasticized cement sheet, such colloiding being further promoted by the series of presser rolls 12 which are arranged in opposition to the rolls 37 which lie between the flights of the conveyor 10. The conveyor passes around suitably driven rolls at the ends thereof and the rolls 12 are also preferably driven by means not shown. A hood 11a is preferably employed above the bath and has a conduit 11b for conducting away the moist gases.

The colloided sheet, as it emerges from the bath 11, passes between a pair of presser rolls 38, 38 and over the rolls 39 to the series of calendering rolls 13 and 14. These rolls are suitably heated, and the sheet is caused to pass back and forth around the two sets of rolls, so as to give the rolls an opportunity to heat the sheet and drive off any water and solvent remaining therein, thus curing the sheet and bringing it to a condition in which it may be used. The finished sheet is wound onto the drum 15 which is removed from time to time and replaced by other collecting drums.

Fig. 3 illustrates a modification in which a different form of colloiding and heating means is substituted for the bath 11 of Fig. 2. In this substitute construction, an oven 40 is provided which encloses the pairs of driven presser rolls 41 between which the sheet is delivered from the presser rolls 42, 42 corresponding to the rolls 30 and 36 of the Fig. 2 construction. The oven 40 is lined with steam pipes 43 and 44 lying above and below the rolls 41. Suitable supply pipes 45, 45 are provided for these pipes, and by this means, the oven may be heated to any desired temperature. The application of the heat, thus provided, in connection with the pressing effect of the rolls 41, 41 serves to colloid the mat layer into a solid sheet as in the construction of Fig. 2. The colloided sheet is delivered between a pair of presser rolls 46, 46, after which the sheet is conducted to calendering rolls as in the construction heretofore described. The bottom of the oven is provided with a drain pipe 47 for conducting away any liquid which is forced from the sheet during the colloiding operation.

The proportions of resin, plasticizer, solvent and water as used in the foregoing process may vary. For the purpose of illustration, the amounts which may be mixed in the tank 6 are as follows:

| | Parts |
|---|---|
| Resin (vinyl acetal) | 6 |
| Plasticizer (diethyl phthalate) | 3.7 |
| Solvent (ethyl alcohol) | 12 |
| Water | 75 |

The resin plasticizer solvent and water form a cloudy solution because of the immiscibility of the plasticizer and water. The mixture is agitated in the mixer 6 until the supernatant liquor is clear, indicating that the plasticizer has been absorbed by the resin. The mixture then is discharged into the tank 7 which contains 500 parts of water, which is violently agitated to form a slurry and keep the plasticizer resin in suspension.

As heretofore explained, the process in its broader aspect may be practiced by precipitating the plasticized resin into a solid dough-like mass which may be formed into sheets by extruding through a slot or by cake pressing and sheeting. Proportions of resins, plasticizer and solvent which may be satisfactorily used in this method are as follows:

| | Parts |
|---|---|
| Resin (vinyl acetal) | 12 |
| Solvent (methyl alcohol) | 88 |
| Plasticizer (diethyl phthalate) | 8 |

The above ingredients are mixed to form a clear solution of medium viscosity. This solution is poured into a large excess of water, i. e. about 1000 parts, which is being agitated. A thick dough-like mass is precipitated consisting of the plasticized resin and small quantities of water and solvent. This mass is not sticky and lends itself readily to extrusion through a slot or orifice to form sheets. It can also be dried and cake pressed and then sheeted by the known methods.

Other proportions of ingredients which may be employed in a similar process are as follows:

| | Parts |
|---|---|
| Resin (vinyl acetal) | 5 |
| Solvent (isoproponol) | 40 |
| Plasticizer (tributyl phosphate) | 40 |
| Water | 15 |

These ingredients are thoroughly mixed and heated at a temperature of about 185 deg. F. until a uniform mass is obtained having a tack-free, dough-like character similar to that obtained by the preceding method. This can be extruded or cake pressed as previously described.

What I claim is:

1. A process of forming a sheet of plasticized synthetic resin which consists in mixing a plasticizer and solvent for the resin with a liquid which will form a solution with the solvent but which is a non-solvent of the resin and plasticizer, adding a finely divided resin to the mixture and agitating until the plasticizer has been absorbed by the resin, conducting the mixture into another body of said liquid and agitating so that the plasticized resin is maintained in suspension, conducting a layer of the mixture away from the bath continuously in the form of a mat and drying it to remove the solvent and liquid to provide a sheet of plasticized resin.

2. A process of forming a sheet of plasticized synthetic resin which consists in mixing a plasticizer and solvent for the resin with a liquid which will form a solution with the solvent but which is a non-solvent of the resin and plasticizer, adding a finely divided resin to the mixture and agitating until the plasticizer has been absorbed by the resin, conducting the mixture into another body of said liquid and agitating so that the plasticized resin is maintained in suspension, conducting a layer of the mixture away from the bath continuously in the form of a mat and applying heat and pressure to the mat layer to colloid the plasticized resin.

3. A process of forming a sheet of plasticized synthetic resin which consists in mixing a plasticizer and solvent for the resin with a liquid which will form a solution with the solvent but which is a non-solvent of the resin and plasticizer, adding a finely divided resin to the mixture and agitating until the plasticizer has been absorbed by the resin, conducting the mixture into another body of said liquid and agitating so that the plasticized resin is maintained in suspension, conducting a layer of the mixture away from the bath continuously in the form of a mat and applying heat and pressure to the mat layer to colloid the plasticized resin, and treating the sheet thus formed to remove the liquid and solvent remaining therein.

ELMER H. HAUX.